Patented Dec. 9, 1930

1,784,703

UNITED STATES PATENT OFFICE

HAROLD A. MORTON, OF AKRON, OHIO

VULCANIZATION ACCELERATOR

No Drawing.   Application filed April 12, 1927.   Serial No. 183,233.

My invention relates to vulcanizable rubber compounds and more particularly to accelerators employed therein for promoting vulcanization of the same and improving the product made therefrom.

The object of this invention is to provide an accelerator which may be manufactured at a relatively low cost and which may be kept in stock without materal deterioration for a long period of time, and which when incorporated in a suitable rubber compound possesses such activity that proper vulcanization can be accomplished in a relatively brief period of time and the resulting vulcanized article will exhibit high abrasive resistance, high tensile strength and elasticity and marked resistance to deterioration or excellent aging qualities.

A preferred example of my invention comprises alpha ethyl beta methyl acrolein chemically combined with aniline by a process of condensation into which is subsequently mixed abietic acid for neutralizing this base; the accelerator so formed being mixed according to the usual factory practice into a rubber stock comprising rubber, sulphur, or other equivalent vulcanizing agent, and preferably an activator such as zinc oxide. Alpha ethyl beta methyl acrolein is prepared by treating a mixture of one molecule of acetaldehyde and one molecule of n-butyraldehyde with dilute caustic soda or potash to condense the aldehydes to the corresponding aldol, which is then dehydrated by splitting out a molecule of water to form the unsaturated aldehyde. It is not essential that the aldol be separated as such, as the reaction may be carried out in one step to yield the unsaturated aldehyde directly. It is also possible to condense the aldol directly to the derivatives without separating the unsaturated aldehyde.

The unsaturated aldehyde is then mixed with the appropriate quantity of aniline and the mixture heated to cause the desired chemical reaction, and the water released is then removed, leaving the desired condensation product. The acid in suitable quantity is then thoroughly mixed into this condensation product, the material being suitably heated to convert the acid into a liquid. A suitable product can be produced by a procedure substantially as follows:

To 98 parts by weight of alpha ethyl beta methyl acrolein is added 93 parts by weight of aniline, and this mixture contained in a suitable vessel is heated to approximately 100° C. for a period of about 2 hours. The released water is then separated and if desired the condensation product may be further dried by any of the usual methods, as by further moderate heating. Into the resultant product about 75 parts by weight of the acid may be thoroughly incorporated, and as stated, the condensation product is, during this step, at such a temperature as to melt the acid if abietic acid or similar acid is used which is a solid at ordinary temperatures. The acid has a neutralizing effect upon the base. The expression "neutralizing" as here used and as employed in some of the appended claims is intended to cover the action or reaction obtained when there is mixed into the condensation product the quantity of acid to effect exact neutralization, as well as a partial neutralization which would be obtained by the use of an inadequate amount of acid, or an acidic effect which would be obtained by the use of an excess of acid. The optimum effect is obtained by the use of approximately the exact amount of acid which will neutralize the base, but the use of a somewhat lesser or greater amount of acid is within the purview of my invention or discovery.

The accelerator resulting from carrying out the prescribed procedure, when incorporated in a rubber compound substantially as in the examples hereinafter recited, produces marked beneficial results, particularly in reference to shortening the time of vulcanization, giving to the vulcanized product high elasticity and tensile strength, great resistance to abrasion and excellent aging qualities.

Without departing from my invention many amino or amine substances may be used in place of aniline in the production of the desired condensation product and without materially affecting the described beneficial qualities thereof. Among such substances the following may be named: ortho toluidine, para toluidine, meta toluylene diamine, para phenylene diamine, ammonia, xylidene, etc.

In those cases where the amine component is dibasic, as for example para phenylene diamine, one molecular equivalent of the amine is usually heated with two molecular equivalents of the aldehyde, although an active accelerator is also obtained by heating one molecular equivalent of the amine compound with one molecular equivalent of the aldehyde.

Likewise without departing from my invention or discovery substitutes for abietic acid may be employed and as examples of such substitutes, acids as follows may be named: acetic, butyric, carbolic, crotonic and stearic.

The addition to the condensation product of an acid such as described enhances the advantage or beneficial properties of the accelerator, but it may be fully omitted without departing from the scope of my invention or discovery which comprehends the use as an accelerator in rubber or similar compounds of the described condensation product resulting from the chemical reaction of alpha ethyl beta methyl acrolein and an amino or amine substance.

As an example of the accelerators and compounds within the purview of my invention or discovery and an appropriate vulcanizing temperature and time for properly vulcanizing an ⅛" sheet made from such compounds, and the characteristics of the resulting vulcanized sheet, examples as follows are given:

Example I

As an illustration of the use of alpha ethyl beta methyl acryl aniline abietate a rubber compound is prepared following ordinary factory procedure of the following ingredients:

| | |
|---|---|
| Smoked sheet rubber | 50 |
| Zinc oxide | 43.285 |
| Magnesium oxide | 2 |
| Sulphur | 4 |
| Alpha ethyl beta methyl acryl aniline abietate | .715 |
| | 100 |

Upon testing cured sheets of the above rubber compound the following results were obtained:

| Cure | Tensile strength (Lbs. per sq. inch) | Elongation at break Per cent |
|---|---|---|
| 15' x 20# | 2,925 | 710 |
| 25' x 20# | 3,475 | 680 |
| 35' x 20# | 3,440 | 650 |
| 45' x 20# | 3,500 | 640 |
| 70' x 20# | 3,305 | 600 |

The first numeral of the tabulations under the word "Cure" represents the number of minutes which the sheet was subjected to the noted vulcanizing temperature. The second numeral under the word "Cure" denotes the vulcanizing temperature, as expressed in steam pressure. The numbers under the heading "Tensile" represent the pounds per square inch to which the test strip, cut from the sheet, was subjected in an ordinary tensile strength testing machine at breakage. The numerals under the heading "Elongation at break" represent the amount of elongation of the test strip cut from the vulcanized sheet at breakage in the testing machine.

Example II

| | |
|---|---|
| Smoked sheet rubber | 50 |
| Zinc oxide | 43.5 |
| Magnesium oxide | 2 |
| Sulphur | 4 |
| Alpha ethyl beta methyl acryl aniline | .5 |
| | 100 |

Test strips cut from cured sheets of the above compound showed the following physical tests:

| Cure | Tensile strength (Lbs. per sq. inch) | Elongation at break Per cent |
|---|---|---|
| 2' x 60# | 2,690 | 760 |
| 5' x 60# | 2,985 | 710 |
| 7' x 60# | 3,360 | 720 |
| 10' x 60# | 3,140 | 700 |
| 15' x 60# | 3,325 | 710 |

Example III

| | |
|---|---|
| Smoked sheet rubber | 50 |
| Zinc oxide | 43.285 |
| Magnesium oxide | 2 |
| Sulphur | 4 |
| Alpha ethyl beta methyl acryl ortho toluidine abietate | .715 |
| | 100 |

Test strips from cured sheets showed the following figures:

| Cure | Tensile strength | Elongation at break |
|---|---|---|
|  | (Lbs. per sq. inch) | Per cent |
| 5′ x 60# | 2,830 | 710 |
| 7′ x 60# | 3,275 | 750 |
| 10′ x 60# | 3,420 | 740 |
| 15′ x 60# | 3,245 | 730 |
| 20′ x 60# | 3,200 | 720 |

Example IV

To illustrate the use of butyric acid a compound is made up consisting of the following ingredients:

| | |
|---|---|
| Smoked sheet rubber | 50 |
| Zinc oxide | 43.265 |
| Magnesium oxide | 2 |
| Sulphur | 4 |
| Alpha ethyl beta methyl acryl para toluidine butyrate | .735 |
| | 100 |

Upon testing cured sheets of the above compound the following figures were obtained:

| Cure | Tensile strength | Elongation at break |
|---|---|---|
|  | (Lbs. per sq. inch) | Per cent |
| 10′ x 20# | 3,175 | 760 |
| 15′ x 20# | 3,480 | 740 |
| 20′ x 20# | 3,560 | 730 |
| 30′ x 20# | 3,815 | 710 |
| 40′ x 20# | 3,815 | 700 |
| 50′ x 20# | 3,800 | 680 |

Example V

| | |
|---|---|
| Smoked sheet rubber | 50 |
| Zinc oxide | 43.285 |
| Magnesium oxide | 2 |
| Sulphur | 4 |
| Alpha ethyl beta methyl acryl para phenylene diamine abietate | .715 |
| | 100 |

The following figures were obtained upon testing cured sheets of the above rubber compound:

| Cure | Tensile strength | Elongation at break |
|---|---|---|
|  | (Lbs. per sq. inch) | Per cent |
| 20′ x 20# | 3,610 | 730 |
| 30′ x 20# | 3,660 | 730 |
| 40′ x 20# | 3,340 | 700 |
| 50′ x 20# | 3,900 | 720 |
| 60′ x 20# | 3,460 | 690 |

Example VI

| | |
|---|---|
| Smoked sheet rubber | 50 |
| Zinc oxide | 43.325 |
| Magnesium oxide | 2 |
| Sulphur | 4 |
| Alpha ethyl beta methyl acryl aniline acetate | .675 |
| | 100 |

The following figures were obtained upon testing cured sheets of the above rubber compound:

| Cure | Tensile strength | Elongation at break |
|---|---|---|
|  | (Lbs. per sq. inch) | Per cent |
| 3′ x 60# | 2,745 | 710 |
| 5′ x 60# | 3,260 | 680 |
| 7′ x 60# | 3,315 | 640 |
| 10′ x 60# | 3,690 | 640 |
| 12′ x 60# | 3,070 | 600 |

The above examples are sufficient to show the extreme activity of the described accelerators and also the high tensile strength and elasticity of the vulcanized product.

Many modifications of the above examples may be practiced without departing from the spirit of the invention.

The organic accelerators as described function at their maximum when zinc oxide is present as an activator.

My accelerators have remarkable resistance to deterioration.

It is pointed out that the described accelerators are extremely active at relatively high temperature, namely, at 60# steam pressure, and that they are also extremely active at lower temperatures such as, for example, 20# steam pressure. They are particularly desirable for the reason that while they may be used as accelerators to cure at 20# steam pressure, there is little or no tendency for pre-vulcanization, the critical temperature being above the temperature to which the material is raised in the commercial mixing or calendering operations.

The quantity of the condensation products employed may vary over wide limits, this being determined mainly by the rapidity of cure desired.

I claim:

1. An accelerator of vulcanization consisting of a condensation product of alpha ethyl beta methyl acrolein and an amino substance.

2. An accelerator of vulcanization consisting of a condensation product of alpha ethyl beta methyl acrolein and an amine.

3. An accelerator of vulcanization consisting of a condensation product of alpha ethyl beta methyl acrolein and aniline.

4. An accelerator of vulcanization consisting of a condensation product of alpha ethyl beta methyl acrolein and an amino substance, neutralized by an acid substantially as described.

5. An accelerator of vulcanization consisting of a condensation product of alpha ethyl beta methyl acrolein and an amine, neutralized by an acid substantially as described.

6. An accelerator of vulcanization consisting of a condensation product of alpha ethyl beta methyl acrolein and aniline, neutralized by an acid substantially as described.

7. An accelerator of vulcanization consisting of a condensation product of alpha ethyl beta methyl acrolein and an amino substance, neutralized by abietic acid.

8. An accelerator of vulcanization consisting of a condensation product of alpha ethyl beta methyl acrolein and an amine, neutralized by abietic acid.

9. An accelerator of vulcanization consisting of a condensation product of alpha ethyl beta methyl acrolein and aniline, neutralized by abietic acid.

10. Alpha ethyl beta methyl acryl aniline abietate as an accelerator for promoting the vulcanization of a rubber or similar compound.

11. A vulcanizable rubber compound comprising rubber, sulphur and a condensation product of alpha ethyl beta methyl acrolein and an amino substance.

12. A vulcanizable rubber compound comprising rubber, sulphur and alpha ethyl beta methyl acrolein aniline.

13. A vulcanizable rubber compound comprising rubber, sulphur, zinc oxide and a condensation product of alpha ethyl beta methyl acrolein and an amino substance.

14. A vulcanizable rubber compound comprising rubber, sulphur, zinc oxide and a condensation product of alpha ethyl beta methyl acrolein and an amino substance, neutralized by an acid.

15. A vulcanizable rubber compound comprising rubber, sulphur, and alpha ethyl beta methyl acryl aniline abietate.

16. A vulcanizable rubber compound comprising rubber, sulphur, zinc oxide and a condensation product of alpha ethyl beta methyl acrolein and aniline.

In testimony whereof, I affix my signature.

HAROLD A. MORTON.